United States Patent
Sturges et al.

(10) Patent No.: US 7,076,346 B2
(45) Date of Patent: Jul. 11, 2006

(54) AUTOMATED CONTINUOUS HAULAGE SYSTEM

(75) Inventors: Robert H. Sturges, Blacksburg, VA (US); Michael Twigger, Blacksburg, VA (US); Amnart Kanarat, Blacksburg, VA (US)

(73) Assignees: DBT America, Inc., Houston, PA (US); Virginia Tech Intellectual Properties, Inc., Blacksburg, VA (US)

( * ) Notice: Subject to any disclaimer, the term of this patent is extended or adjusted under 35 U.S.C. 154(b) by 232 days.

(21) Appl. No.: 10/399,067

(22) PCT Filed: Oct. 9, 2001

(86) PCT No.: PCT/US01/31487

§ 371 (c)(1),
(2), (4) Date: Oct. 22, 2003

(87) PCT Pub. No.: WO02/30792

PCT Pub. Date: Apr. 18, 2002

(65) Prior Publication Data

US 2004/0054434 A1    Mar. 18, 2004

Related U.S. Application Data

(60) Provisional application No. 60/239,132, filed on Oct. 10, 2000.

(51) Int. Cl.
*G01M 17/00* (2006.01)
*G06F 19/00* (2006.01)
*G06F 7/70* (2006.01)
*E21C 35/08* (2006.01)

(52) U.S. Cl. ............... 701/29; 701/23; 701/28; 701/50; 701/223; 701/301; 340/435; 208/411.1; 208/412; 208/419; 208/408; 299/1.7; 299/1.9

(58) Field of Classification Search ............... 701/23, 701/26, 25, 28, 223, 301, 50; 340/435; 280/411.1, 280/412, 419, 408; 299/1.7, 1.9
See application file for complete search history.

(56) References Cited

U.S. PATENT DOCUMENTS

| | | | |
|---|---|---|---|
| 4,465,155 A | 8/1984 | Collins | 180/169 |
| 4,868,752 A | 9/1989 | Fujii et al. | 701/28 |
| 4,920,520 A * | 4/1990 | Gobel et al. | 367/99 |
| 5,587,929 A | 12/1996 | League et al. | 342/159 |
| 5,751,211 A | 5/1998 | Shirai et al. | 340/435 |

(Continued)

*Primary Examiner*—Thomas G. Black
*Assistant Examiner*—Brian J. Broadhead
(74) *Attorney, Agent, or Firm*—Thomas W. Ryan; DLA Piper Rudnick Gray Cary US LLP

(57) ABSTRACT

The present invention relates to an automated continuous haulage apparatus and method designed for use in underground environments. Each mobile bridge carrier (10) contains distance measurement (70) and angular position (74) means for determining the mobile bridge carrier's (10) position and the angular position of attached piggyback conveyors (30). Means for determining the ceiling height (76) are utilized to adjust the height of the piggyback conveyors (30). On each mobile bridge carrier (10), input from the various sensors is received by an electronic controller (80) that calculates the position and orientation of the bridge carrier (10) and attached piggyback conveyors (30). The controller then plans an optimal path of movement for the bridge carrier (10) and computes the rate of movement for each independently operated track assembly on the bridge carrier such that the bridge carrier (10) and piggyback conveyors (30) arrive as close as possible to the planned path.

15 Claims, 7 Drawing Sheets

U.S. PATENT DOCUMENTS

| | | | |
|---|---|---|---|
| 5,881,832 A * | 3/1999 | Zitz et al. | 180/169 |
| 5,999,865 A | 12/1999 | Bloomquist et al. | 701/25 |
| 6,062,801 A | 5/2000 | Cooper | 414/470 |
| 6,296,317 B1 | 10/2001 | Ollis et al. | 299/1.4 |
| 6,317,057 B1 | 11/2001 | Lee | 340/901 |
| 6,349,249 B1 | 2/2002 | Cunningham | 701/28 |
| 6,694,233 B1 * | 2/2004 | Duff et al. | 701/23 |
| 6,775,396 B1 * | 8/2004 | Matsunaga | 382/106 |

* cited by examiner

AUTOMATED CONTINUOUS HAULAGE SYSTEM

This application claims the benefit of Provisional application Ser. No. 60/239,132, filed Oct. 10, 2000.

BACKGROUND OF THE INVENTION

1. Field of Invention

The present invention relates generally to the automated control vehicles, and more particularly, to an apparatus and method for automating the operation of one or more underground mining vehicles used in continuous mining applications.

2. Description of Prior Art

When performing underground excavation, such as for example coal mining operations, it is desirable for efficiency purposes to continuously operate the mining apparatus breaking coal away from the face. In order to do so, means must be available for quickly and continuously hauling the loosened material from the mining site to an area remote from the mining site. One such continuous haulage system presently available and used in coal mines comprises a series of conveyor mechanisms pivotally linked together. The components of this system through the mine from a continuous miner. The continuous miner breaks up the solid coal deposits to material sized to be more easily transported to an area remote therefrom. Some of the components which comprise such systems may be self-propelled tracked mobile conveyor units while others may be conveyors which span or bridge an area between mobile units. The mobile units used in the continuous haulage system are sometimes referred to as mobile bridge carriers (MBCs) and are generally crawler mounted chain conveyor units, each operated and steered by a mine worker.

In a continuous haulage system that may include, for example, several mobile bridge carriers, the first of the several mobile bridge carriers is positioned adjacent to the discharge end of a continuous miner. The mobile bridge carrier moves in concert with the continuous miner and receives the mined material in a small hopper at its receiving end. Alternatively, a Feeder-Breaker may be positioned between the continuous miner and the mobile bridge carrier to break up the larger pieces of mined material. The discharge end of the mobile bridge carrier is pivotally connected to another continuous haulage system component, generally a piggyback bridge conveyor or "pig". A series of pivotally connected mobile bridge carriers and bridge conveyors provide the means to articulate the continuous haulage system around corners and allow it to move in concert with the continuous miner. A conventional MBC has a leading and a trailing conveyor extension, which can be raised or lowered under control of the operator. These degrees of freedom are essential for maintaining clearances of the respective piggyback conveyor ends from the mine roof and the mine floor under varying inclinations and elevations. Adding pairs of tracked vehicles and bridge conveyors into the system can extend the overall length of the system, as required by the particular mining job. The last bridge conveyor is coupled or aligned with a belt conveyor, which is fixed on the ground during use. The continuous haulage system therefore provides a quick and efficient means for transporting the mined material from the face.

The plurality of linked MBCs and piggyback bridge conveyors may extent in a "zigzag" manner over a distance of several hundred feet, for example. The components must be capable of advancing with the continuous miner, while navigating the various turns. In part to accommodate the operation of the system, each MBC includes a dolly at one or both end. The dolly is slidable in a longitudinal direction and provides the attachment point for the respective bridge conveyor. The dolly allows a leading MBC to advance, with the trailing bridge carrier following in unison. The trailing bridge conveyor will also advance the dolly of the trailing MBC. The trailing MBC may remain stationary during the advancement of the leading components. The trailing MBC may subsequently advance in a similar manner, pulling yet another piggyback bridge conveyor and dolly. In this manner, the linked components may advance in an unsynchronized fashion, however the MBC operator typically cannot see the MBC ahead or behind him, and only has a limited view of the piggyback conveyors linked to his MBC. The MBC operator has only a limited view of the mine wall opposite the driver's cab, and his view of the mine wall nearest the cab is limited by lighting conditions and his close proximity to it. Further, each conventional MBC requires an operator in the cab at all times during mining operations. Particularly with a long train of MBCs and piggyback carriers, the use of multiple human operations adds to higher overhead costs and increased opportunities for an injury to employee to occur.

Therefore, there exists a need for a continuous haulage system which reduces the amount of manpower required to operate the system and increases the ability to accurately determine the position of the entire carrier system.

An MBC or piggyback bridge conveyor may encounter terrain requiring adjustment of the height for clearance of the mine ceiling. The MBC and bridge conveyors must stop and remain stationary during manual height adjustment.

SUMMARY OF INVENTION

It is therefore one object of the instant invention to provide a method and apparatus for detecting the position of an mobile bridge carrier. It is another object of the present invention to provide a method and apparatus for automatically raising and lower a conveyor in response to mine ceiling and floor conditions. It is another object of the present invention to provide a method and apparatus to determine the angle between a piggyback conveyor and at least one mobile bridge carrier. It is a further object of the invention to provide an apparatus and method for determining the movement of an individual mobile bridge carrier as well as a plurality of mobile bridge carriers and piggyback conveyors as part of a continuous haulage system. It is yet another object of the present invention to provide a method and apparatus for automating an complete continuous haulage system that encompasses previously listed objectives.

BRIEF DESCRIPTION OF THE DRAWINGS

The present invention may be better understood with reference to the detailed description in conjunction with the following figures where like numerals denote identical elements, and in which.

DESCRIPTION OF PREFERRED EMBODIMENTS

Mechanical Components

In the preferred embodiment, at least one pair of mobile bridge carrier (MBC) and piggyback conveyor ("Pigs") units of a continuous haulage system are automated such that navigation through an underground mine can be accomplished with little or no operator input or intervention. In one embodiment, automation is accomplished through the use of a series of sensors mounted on each MBC and an electronic controller which receives data from the respective sensors, processes the data through one or more algorithms and then sends commands to the locomotion and height mechanisms of the MBC. While in the preferred embodiment, each MBC can operate (navigate) independently of the other MBC in the continuous miner assembly, it is contemplated that each MBC controller can exchange data and cooperate with the controllers of the other MBCs.

Figure 1:
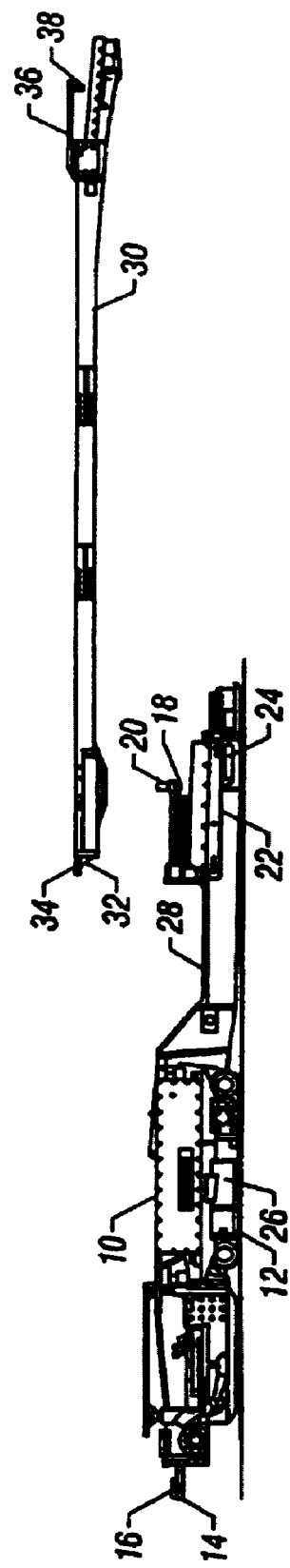
FIG. 1 is a side elevational view of conventional mobile bridge carrier and piggyback conveyor that is modified and used according to the disclosed apparatus and method.

An exemplar mobile bridge carrier 10 and piggyback bridge conveyor 30 unit pair is illustrated in FIG. 1. The MBC 10 moves through the use of a pair of track assemblies 12. Because the left and right track assemblies 12 operate independently of each other, turning is accomplished through differential speed between the respective tracked assemblies. Each MBC contains an aft female yoke 14 and a forward male yoke 18. The female yoke 14 is further defined by an opening 16 for receiving the connector pin 38 of male yoke 36 of the trailing piggyback conveyor. Accordingly, the male yoke 18 contains a connecting pin 20 for connection to opening 34 of the female yoke 32 of the advancing piggyback conveyor 30. In one embodiment of the invention, the male yoke 18 is attached and part of a slidably movable dolly 22 mounted to track 28. The male yoke 18 may be raised or lowered with respect to the dolly 22 by conventionally know means, such as hydraulics 24, thus raising or lowering the respective piggyback conveyor 30. Similarly, the female yoke 14 may also be raised and lowered thus raising and lowering the trailing piggyback conveyor 30 (not shown), if desired and suitably equipped. It will be appreciated that the location of a male yoke 18 and a respectively mating female yoke 32 may be opposite from that as shown in FIG. 1. For example, the female yoke 32 could be provided on the MBC 10, which the male yoke 18 could be provided on the piggyback conveyor 30.

Figure 2:
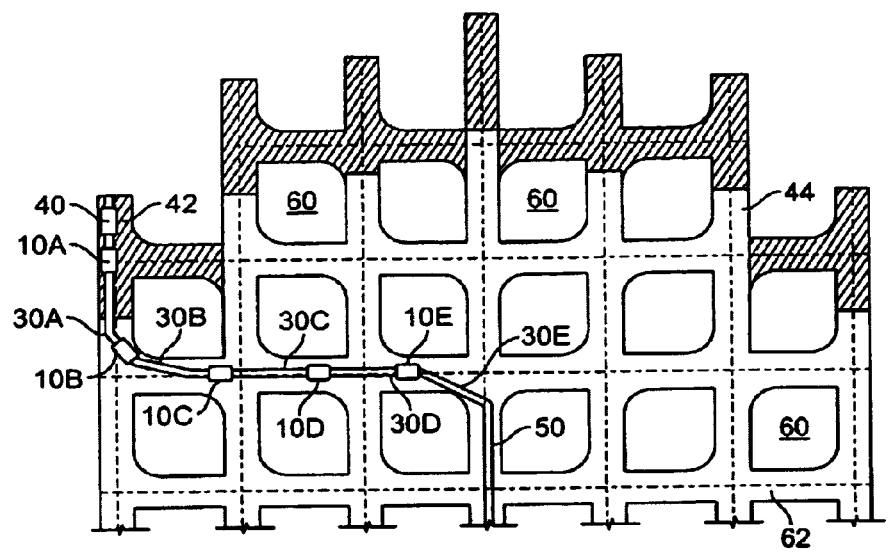
FIG. 2 is a top plan view of an underground excavation site illustrating the general position and configuration of a continuous haulage system that is automated pursuant to the instant invention.

An overall view of a continuous mining and haulage assembly within an underground mine is illustrated in FIG. 2. The continuous miner 40 excavates the unmined coal or other materials interest 42, which are illustrated in FIG. 2 as shaded portions, from the mine. The previously mined portions of the mine, 44, are illustrated in the FIG. 2 as being unshaded. The continuous miner 40 passes mined material to the first MBC 10A. The material is then conveyed to the next MBC 10B by way of a first piggyback conveyor 30A located between and attached to MBCs 10A and 10B. Depending on the amount of distance to be covered, additional MBCs 10C, 10D and 10E and piggyback conveyors 30B, 30C, 30D and 30E, for example, can be added in order to extend the continuous mining and haulage assembly. A fixed and extendable conveyor belt 50 is attached to the trailing piggyback conveyor 30E and outputs the mined material to a suitable shuttle vehicle, conveyor system, or other distribution means out of the mine.

As the continuous miner moves forward during mining operations, the MBCs 10A–E and the piggyback conveyors 30A–E also move forward. Similarly, the MBCs and the piggyback conveyors move backwards to allow the continuous miner pull to back from the area being mined. In a conventional continuous haulage system, the MBCs 10A–E would each be manned by a driver in order to steer the MBC and the connected piggyback conveyors around the mine, particularly the pillars of unmined material 60. The unmined pillars 60 and other unmined material 42 generally define the mine walls 62 through which the continuous haulage system must navigate.

Figure 3:
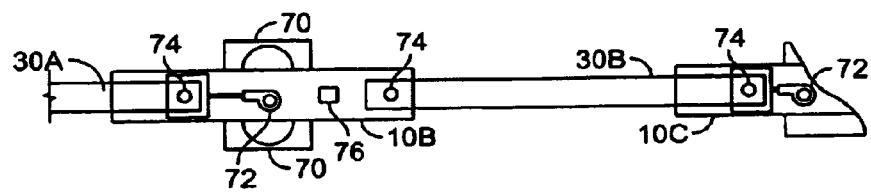
FIG. 3 is a top plan schematic illustrating sensor placement according to the instant invention.

FIG. 3 sets forth a schematic of the general sensor layout of the preferred embodiment of the invention. An MBC 10B and a piggyback conveyor 30B are illustrated along with a partial view of a piggyback conveyor 30A and MBC 10C. As will be more fully described below, the automated continuous haulage system of the invention utilizes three types of sensor components. The first sensor components are distance measurement means 70. The distance measurement means 70 measures the distance between the MBC and adjacent wall of the nine. At least one distance measurement means is used, but a plurality is preferred. Placement of the distance measurement means upon longitudinal sides of the MBCs has been found to be the optimum location for accurate measurements. In the preferred embodiment of the invention, SICK infrared laser range finder scanners (SICK Optik, Inc., Germany) are used as the distance measurement means. Alternative non-contact distance measurement devices, such as ultrasonic distance measurement devices by Massa Technologies, Hingham, Mass., may also be affixed to the longitudinal sides of the MBC at a plurality of locations. Further alternative embodiments of distance location means include contact-type sensors to perform the same measurements, such as passive or movable feelers, which detect mine wall presence by tactile means or by completing a local electrical circuit by contact. In such electrical contact embodiments, the voltages and currents must be considered intrinsically safe by locally applicable mine safety standards. One sufficiently skilled in the art will recognize that moveable or passive feelers would require a means to detect relative force or torque on such feeler as a condition that distinguishes free movement of the feeler in the air, and intermittent or steady contact with the more rigid mine wall.

The second type of sensor used in the inventive automated continuous haulage system is a height determination means 76 to measure the clearance between the MBC 10 with attached piggyback conveyors 30 and either or both the floor and ceiling of the mine passage. Each MBC 10 preferably requires only one height determining means 76, but multiple determining means 76 may be used for redundancy. As will be described in greater detail, below, in response to the measurements obtained by the height determining means, the height of the attached piggyback conveyors 30, in relation to the mine ceiling can be adjusted either by hydraulically raising or lowering the dolly 22 by dolly hydraulics 24 or the skirt height MBCs 10 themselves through hydraulics 26 mounted to the drive assemblies 12, schematically shown at FIG. 1.

In the preferred embodiment of the invention, the height determining means is an ultrasonic distance measurement device, such as made by Massa Technologies (Hingham, Mass.). As is well known in the art, these devices transmit an ultrasonic signal which is reflected off of the surface of interest, such as the mine ceiling or mine floor, and the distance between the surface and the sensor is calculated. The sensor must detect this distance or clearance in a timely manner, for example, a frequencies greater than one measurement per second. It has been found that frequencies greater than 100 measurements per second would result in significantly more data than necessary for reliable driving at current rates of vehicle speed, on the order of one foot per second.

One alternative embodiment for height determination and control comprises a limit switch to which is attached a short length of flexible wire rope. The proximal end of the wire rope is rigidly attached to the operating lever of the limit switch. The distal end of the wire rope extends beneath the conveyor and drags along the floor of the mine as the vehicle moves forward or backward. If the wire rope should not touch the floor, its relative orientation will be nearly vertical, and this condition is sensed by the limit switch. The limit switch in turn signals the hydraulic control valve of the conveyor elevator to lower the conveyor extension. In the event that the wire rope is dragging on the mine floor, its relative orientation will be far from vertical, and this condition is similarly sensed by the limit switch. The limit switch in turn signals the hydraulic control valve of the conveyor elevator to raise the conveyor extension. One skilled in the art will recognize that the limit switch preferably will feature a dead-band of "no action" for the elevation control, during which the wire rope is dragging slightly on the mine floor and its relative orientation will be nearly vertical.

An MBC, such as shown in FIG. 1, has attached to its leading and trailing yokes 18, 14 a pin 20 or socket 16 which connects to the corresponding socket 34 or pin 38 of a piggyback conveyor 30. These pins or sockets provides angular azimuth motion of in excess of 180 degrees, angular elevation freedom of ten to twenty degrees and angular roll freedom of several degrees. As previously detailed MBC features a sliding dolly 22 on which one of the pin and socket connections to a piggyback conveyor is mounted. As previously disclosed in FIG. 1, the dolly is slidably mounted to track 28. The motion of this dolly imparts a free longitudinal sliding degree of freedom to the connection between one piggyback conveyor and the MBC, typically at the out-by end of the MBC. Referring again to FIG. 3 as well as FIG. 1, a dolly position determining means 72, such a linear potentiometer, is mounted to each MBC, such as MBCs 10B and 10C, to detect and record the relative movement of the dolly 22 upon the track 28 (shown in FIG. 1) such that when a predetermined measurement is reached, the MBC controller 80 can determine that the continuous haulage system is moving forward or backwards and how fast. Put another way, if a first MBC 10A is moving forward it will pull a trailing piggyback conveyor 30A forward. The trailing piggyback conveyor 30A will be an advancing piggyback conveyor as to a second MBC 10B and will be connected to dolly 22 of MBC 10B. Conveyor 30A will pull the dolly 22 forward upon the track 28, the movement of which will be detected by the linear potentiometer 72. This may then signal the controller 80 (FIG. 4) that forward movement is required.

The degrees of freedom between the MBC and attached piggyback conveyor are essential for linking the units of a continuous haulage system while maintaining the freedom to steer around mine pillars and to allow for the precise speeds and positions of each MBC to be unsynchronized over a range sufficient to include the operators' ability, or in the case of the instant invention, a computer controller, to drive the MBC. If the angles between the MBCs and the attached piggyback conveyors are too great, there is a danger of the entire continuous haulage system jackknifing or a portion rolling over. The location of a piggyback conveyor 30 is determined indirectly by sensing the angle between an MBC 10 and the piggyback conveyor 30 at the respective pin and socket joints. Therefore, the third type of sensor utilized in the inventive automated continuous haulage system and illustrated in FIG. 3 is an angle measurement means 74 to determine the angle between an MBC 10 and an attached piggyback conveyor 30. Because an MBC 10 generally has a leading and a trailing piggyback conveyor 30 attached to it, each MBC 10 will contain two sets of angle measurement means 74. In the preferred embodiment of the invention, the angle measurement means 74 is an angular potentiometer or rotational potentiometer, as are conventionally known in the art. A conventional flexible coupling between the potentiometer and an attachment point on the pin accommodates the out-of plane angular motions. This feature is not found on any mining equipment links to the best of the inventors' knowledge. Furthermore, the prevailing method of attaching such linked units exhibit large clearances between a substantially cylindrical pin and a substantially beveled socket. The spherical joint employed in conventional trailer applications would not suit this purpose since there is no convenient location for the potentiometer. The instant invention preferably includes the mounting of such potentiometer within the spherical structure of the joint, to minimize the lateral motions such that a conventional flexible coupling can be employed.

Operation

Figure 4:
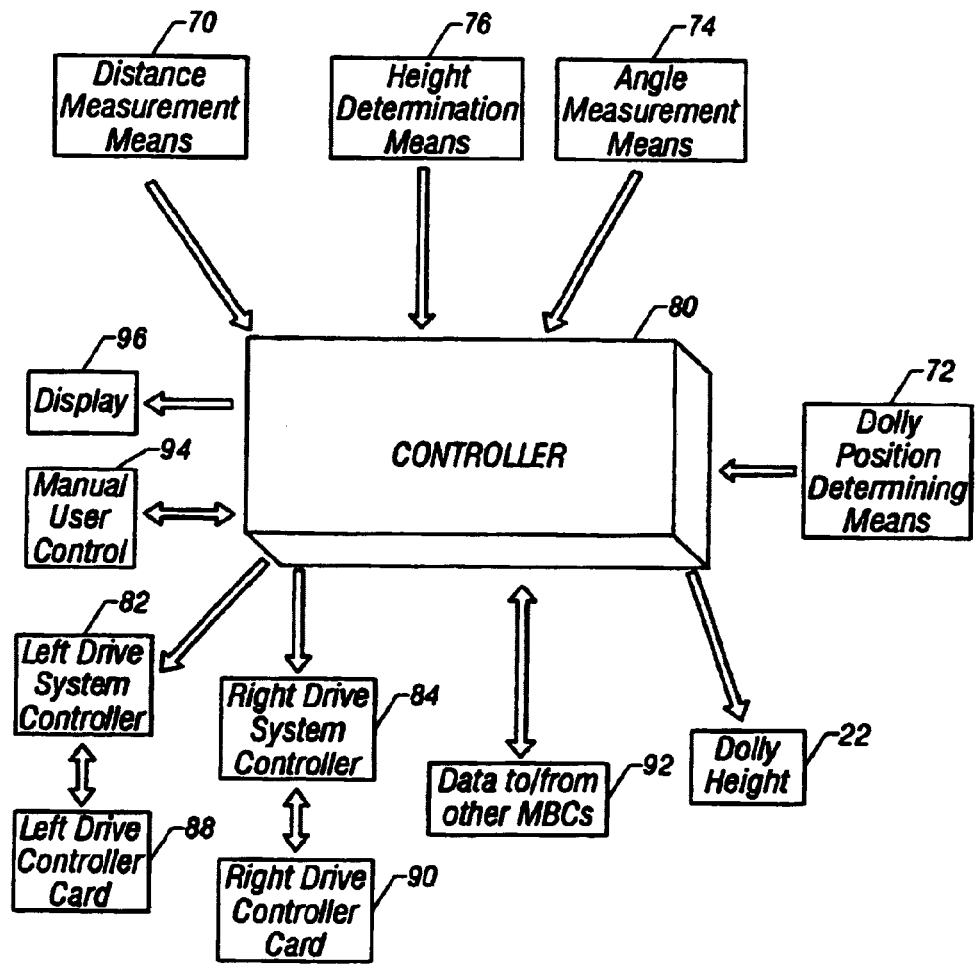
FIG. 4 is block diagram illustrating signal inputs and outputs to and from an electronic controller.

As will be described in detail below, in order to automate the elements of a continuous haulage system (MBCs 10 and piggyback conveyors 30) the data obtained from the respective sensors must be collected, integrated, and processed such that the continuous haulage system can be moved in relation to the advancing continuous miner 40 and the piggyback conveyors be lowered in response to distance between the mine floor and ceiling. FIG. 4 illustrates the general input/output arrangement of the invention of interest.

Central to the operation of the inventive continuous haulage system is an electronic controller 80. Because each MBC 10 can, and preferably does, operate independently of the other MBCs in the haulage chain, each MBC 10 contains its own controller 80. Currently, a personal computer is preferably used in each MBC as the controller 80. The MBC controller is implemented on a PC running WINDOWS OS (Microsoft, Inc., Redmond, Wash.) with the minimal requirements of a 200 MHz CPU (Intel, Inc., Santa Clara, Calif.) and 64 Mbytes of RAM. LABVIEW, (National Instruments, Austin, Tex.) a graphical programming language, is used as a data acquisition tool to gather data from the respective sensors. All control algorithms are written in C, and complied into a suitable format that can be called from LABVIEW. The PC-based controllers communicate with the sensors for each MBC via serial cables or parallel cables. Each MBC is also equipped with left and right track velocity or drive system controllers 82, 84 as part of drive track assemblies. The left and right drive system controllers 82, 84 further contain drive system control boards. These boards receive the speed commands from the controller 80, and perform the closed-loop speed control for the tracks by maintaining actual track speeds as close as possible to the desired track speeds, taking into account slippage and error correction.

Generally, sensor data is received by the controller 80 from the distance measurement means 70, the height determination means 76 and the angle measurement means 74. The sensors and controller 80 can be continuously monitoring the position of the MBC. In the alternative, upon receipt of a signal of predetermined strength from the linear potentiometer 72, the controller 80 is signaled that the advancing piggyback conveyor 30A is moving the dolly 22 forward or backwards and thus the MBC under control should thus move forward or backwards. As further detailed in the following description, the controller 80 processes the received data from the sensor and computes the travel path travel of the MBC under its control. Further, the controller determines whether the advancing or trailing piggyback conveyor, or both, need to be raised or lowered in relation to the distance between the mine floor or ceiling. The controller then signals the drive controller cards 88, 90 of the left and right drive controllers 82, 86 of one or both track assemblies 12 to move. The controller 80 will also signal the dolly 22 to raise or lower, if required by a change in ceiling clearance. The controller 80 can also output the relevant measurement data in a user readable format to a display 96. A manual user control 94 is connected to the controller 80 in the event that human intervention is required.

Figure 5:
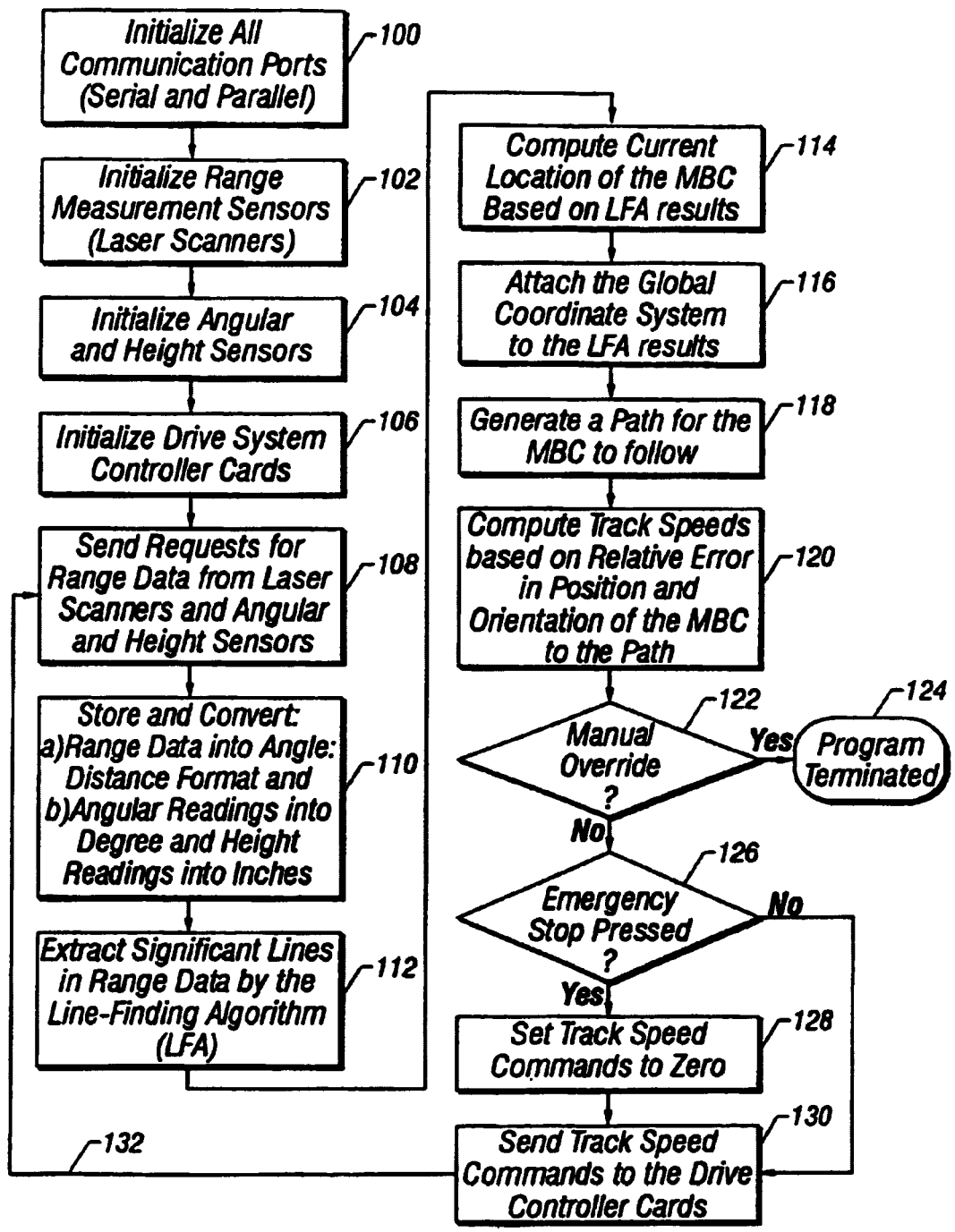
FIG. 5 is a flow chart setting forth the basic control process of the instant invention.

FIG. 5 sets out a flow diagram of the previously described input/output process in more specific detail. All communication ports are initialized 100 and followed by initialization of the range measurement sensors (SICK laser finders) 102. The angular and height sensors are also initialized 104 as well as the drive system controller cards in step 106. Initialization steps 100, 102, 104, and 106 are generally carried out by the controller 80 at the beginning of the mining operation. Upon commencing mining operations, the controller sends requests for range data from the laser scanners and the angular and height sensors 108. The laser range finder scanners and sensors respond by returning the requested data and readings back to the controller 80. Raw data from the sensors is stored and converted 110 into the appropriate format. The raw range data, in an numeric array containing 181 elements, is converted into a 2-by-181 matrix, where the first and second rows represent angles and corresponding measured distances, respectively. The readings from the angular and linear potentiometers is converted into angles (degrees) and length (inches/meters), respectively The controller extracts significant lines in range data using a Line-Finding Algorithm (LFA) 112. The controller then computes the current location of the MBC based on the LFA results 114 and attaches a Global Coordinate system to the LFA results 116. A path for the MBC to follow is generated by the controller 118 and the speeds of the two track assemblies are computed based on relative error in the position and orientation of the MBC in relation to the path 120. Steps 110–120 will be further detailed, particularly the specifics of the Line-Finding Algorithm.

If a manual override 122 is initiated, the control program is terminated 124. In addition, the continuous miner 40 and each MBC 10 contains an emergency safety stop mechanism. The controller queries if the emergency stop was pressed 126 and, if so, sets the track speed commands to zero 128. The controller finally sends track speed commands to the drive controller cards 130. The MBC will then travel in the appropriate direction, unless the emergency stop was pressed, which then results in zero travel. The control sequence then returns to step 108 via loop 132.

In automating the travel of an MBC with attached piggyback conveyors, there are several physical factors that must be taken into account. For example, the location of the pivots between the MBCs and the piggyback conveyors determine its geometry of the continuous haulage system, and are thus necessary to guide the respective MBC/piggyback conveyor segments in the absence of any other forces. With significant forces interacting with the MBC, a compensating control is needed to maintain configuration guidance within tolerances at the highest speeds obtainable. The effects of gravity and pin-transmitted forces are not directly measurable in the field, but the performance of the MBC drive system depends on them. Automatically commanding the MBCs also entails knowledge of the current speed (measured from the drive wheels) and the computation of a desired speed based in part on the current and predicted deviation from the planned path. With path planning assumed to be in place, the new control law would sample the recent history of the system configuration in the neighborhood of the MBC, apply an internal model of predicted slip, and compensate the desired speed to account for this slip. The system configuration history (positions and angles of each link in the system of vehicles) strongly influences the required compensation since it can supply two pieces of information: first, how the ground conditions have changed since the last time frame, and the sensitivity to ground conditions due to the current configuration. For example, with all piggyback conveyor angles at nearly zero, lateral slip is a function of only gravity, local inclination and surface shear stress. However, for both pig angles at 90°, the neighboring MBCs exert a torque and a lateral shear force on the subject MBC which easily swamp the inclination effects. As such, the controller must deal with these factors, and others, and compensate for them.

A) MBC/Piggyback Conveyor Travel

Designing a navigation system for a continuous haulage system is complicated because the continuous haulage system possesses many unique characteristics. For example, the motion of the continuous haulage system is governed by both holonomic and nonholonomic constraints. Moreover, the number of the degree of freedom of the system varies depending upon the system configuration, and the model of tracked vehicles in the system is very complex. These characteristics pose difficulties to the navigation problem, and make the problem very challenging.

The basic idea in navigating the continuous haulage system through the underground mine environment is to correctly position each of the MBC at the right place at all time. To achieve this, each of the MBCs in the system needs to closely track a virtual path laid on the mine floor. This virtual path is generated by a path planner based upon environmental data sensed by laser range finders, for example. By taking advantage of the fact that each MBC can move independently within a dolly's traveling limits, after determining the current position of each MBC, the system can control the motion of each MBC such that it track planned path closely and, at the same time, does not hit Dolly limits. Because the MBCs can move independently from each other, it is more efficient to have a local controller for each MBC rather than having one centralized controller for all MBCs.

Figure 7:
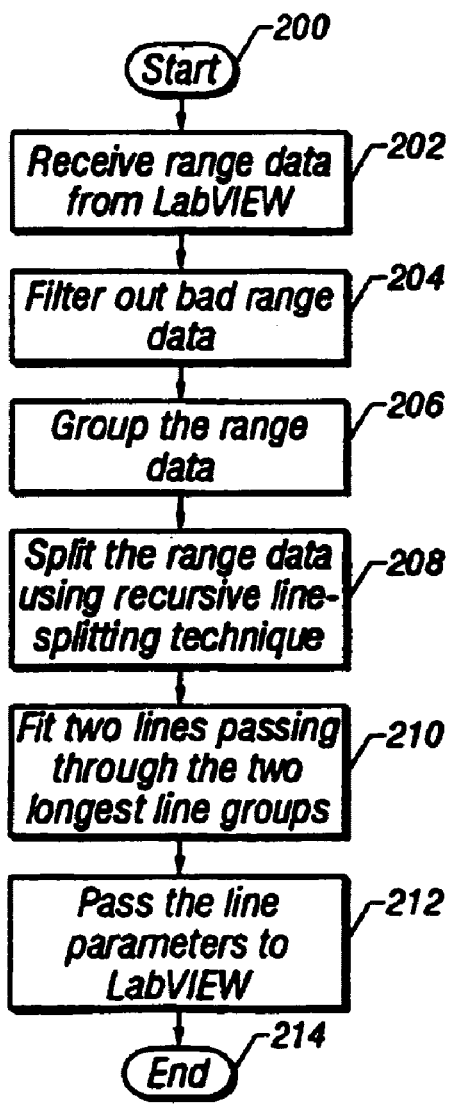
FIG. 7 is a flow chart setting forth the Line Finding Algorithm of the instant invention.

One vital piece of information that every autonomous mobile system needs to know is its current position and orientation (POSE). The system, therefore, must have ability to localize itself in its working environment. In the instant invention, range data from a laser scanner allows the ability to calculate the current POSE of the MBC. By using a "Line-Finding Algorithm," (LFA) the two longest straight lines are extracted from the range data using a recursive line splitting technique. The Line-Finding Algorithm works with the range data from one laser scanner at a time. With reference to FIG. 7, at step 202, the LFA receives the range data collected by LABVIEW in the form of a 2-by-181 matrix, where the first and second rows represent angles and corresponding measured distances, respectively. Because the angle resolution of the laser scanner is set to 1°, we have 181 distance values from 0° to 180°. Once the range data is gathered, the algorithm, at step 204 filters out bad or unnecessary range data by checking both front and rear piggyback conveyor angles, via the angular potentiometer and cutting off the beginning and ending sections of the range data according to those angles. This prevents the algorithm from mixing range data from mine wall and the continuous haulage system together. At the same time, the algorithm also ignores all range data that have corresponding measured distance more than a specified limit to avoid misinterpretation of the range data. At step 206, the range data is then divided into groups by checking for difference in values of consecutive measured distances. Whenever the difference in measured distances is more than a previously set threshold, the range data is divided at that point. This helps us in separating profiles of different mine walls that hinder each other. After the range data has been divided into groups, the biggest group containing the longest line will be chosen for further analysis.

Figure 6:
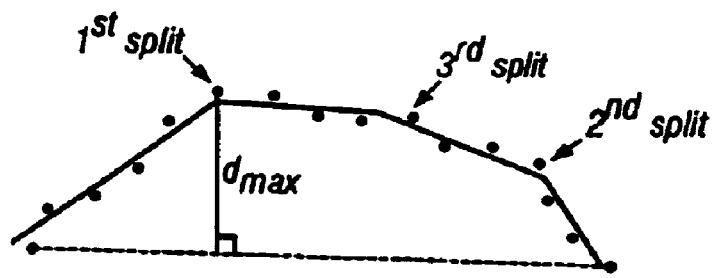
FIG. 6 is diagram illustrating the results of a typical recursive split of range data.

At step 208, the algorithm proceeds with applying a recursive line-splitting technique to split the selected group of the range data into subgroups. This technique can best be explained by referring to FIG. 6. From the figure, a group of points is given. The technique begins with connecting a line, shown as a dashed line in FIG. 6, between the first and the last points that belong to the group. Then, it computes the distance from each point in the group to that line. If the largest distance exceeds a specified limit, the algorithm splits the group at the point that corresponds to the largest distance from the line. The group is now split into two subgroups, and the same procedure (connecting a line between the first and last points in each subgroup, computing distance from each point, etc.) is further applied to both remaining groups. The procedure keeps going on until the specified limit is satisfied for all subgroups. The results are four groups of points as distinguished by solid lines in FIG. 6. After the range data has been split into subgroups, two biggest subgroups that represent two longest lines in the range data will be selected at step 210. In this case, the first and the third groups from the left will be chosen to fit lines through. These two lines approximately represent the entire profile of mine walls captured by laser scanners at any instant, and they can be used to determine the current POSE of the MBC in every control cycle.

Figure 8:
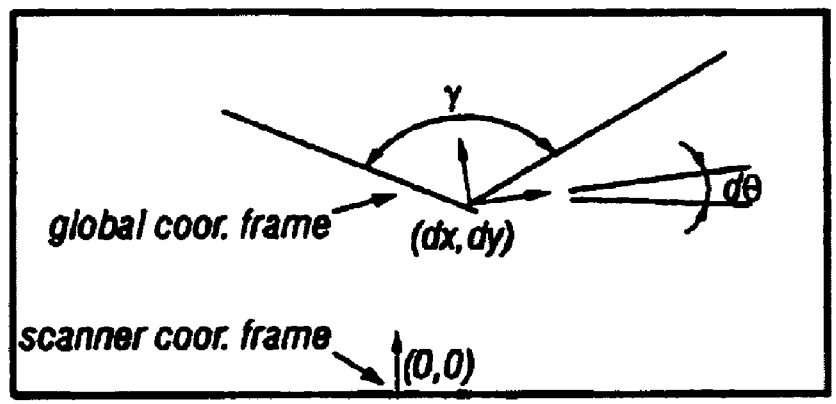
FIG. 8 is a graphical comparison of a scanner coordinate frame measurement versus a global coordinate frame measurement.

Once the line finding algorithm is applied, the controller applies a localization algorithm to calculate and thus determine the POSE of the MBC. The algorithm first establishes a global coordinate frame, such as is shown in FIG. 8. The angle between two previously obtained lines determines the location and the orientation of the coordinate frame. If the value of the angle is bigger than a specified threshold, say 160°, the two lines seem to form a straight line. In this case, the algorithm can put the origin of the coordinate frame anywhere we like along one of these two lines; however, in the preferred embodiment of the invention, the origin at a point is placed along these two lines that is closest to the laser scanner, for sake of simplicity. The orientation of the coordinate frame is determined by pointing the Y-axis in the same direction as the angular bisector line. On the other hand, if the value of the angle is less than a specified threshold, the position of the origin is the intersection point of those two lines while the orientation can be determined as aforementioned method.

Since the range data is measured in the laser scanner coordinate frame, one must transform points from the scanner coordinate frame to the global coordinate frame. Referring to FIG. 8, let the POSE of an object in the global coordinate frame be (x, y, θ), and let (dx, dy, dθ) be the POSE of the global coordinate frame from the scanner coordinate frame. The orientation of the x-axis of the coordinate frame, dθ, is determined from dθ=γ−(π/2) radian. Because one knows where the laser scanners are installed on the MBC, one knows the center of geometry of the MBC relative to each sensor. The coordinate transformation of the POSE of the object from the scanner coordinate frame to the global coordinate frame can be accomplished by the following equations:

$$\begin{bmatrix} x \\ y \\ 1 \end{bmatrix} = \begin{bmatrix} R' & -R' & P_{org} \\ 0 & 0 & 1 \end{bmatrix} \begin{bmatrix} X \\ Y \\ 1 \end{bmatrix} \quad (1)$$

and $$\theta = \phi - d\theta \quad (2)$$

where $$R = \begin{bmatrix} \cos(d\theta) & -\sin(d\theta) \\ \sin(d\theta) & \cos(d\theta) \end{bmatrix}$$

$$P_{org} = [\, dx \quad dy \,]^T$$

$(X, Y, \phi)$ = POSE in the scanner coordinate frame.

Since the exact location of the laser scanner on the MBC is known, the POSE of the center of geometry of the MBC in the scanner coordinate frame is also known. The value of (dx, dy, dθ) from previous computation is also known. Therefore, the location of the MBC with respect to the global coordinate frame can be determined using equations (1) and (2), above.

Once location is determined, the automated MBC then need to determine where it should go. Path planning is among the most difficult problems in mobile robotics. One approach to solving the path-planning problem is based on the concept of the configuration space with the maximum clearance between piggyback conveyors and mine walls as an optimal criterion. However, the approach adopted in the instant invention, detailed below, takes into account multiple-optimal criteria.

Figure 9:
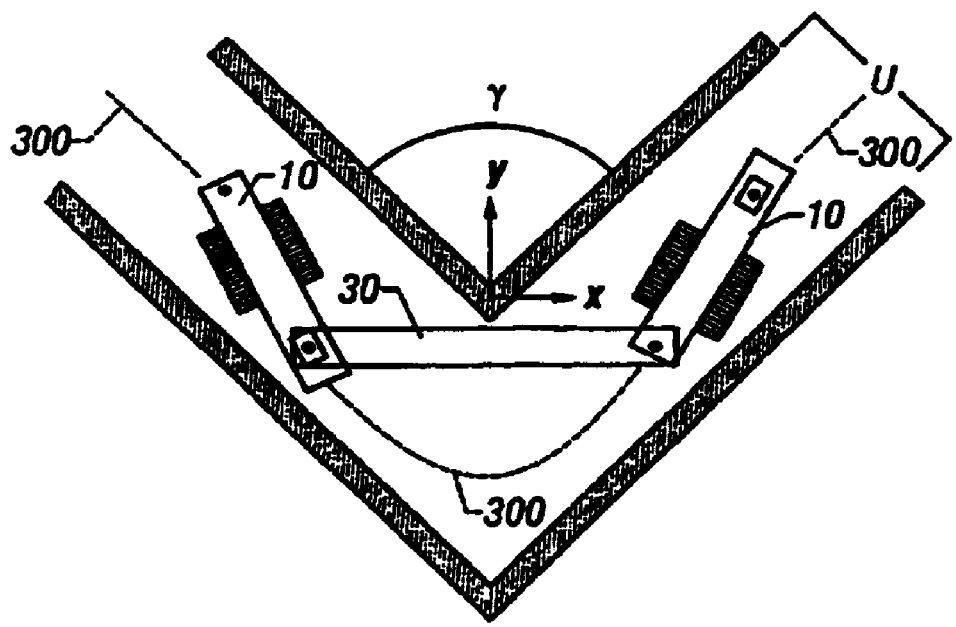
FIG. 9 is a top plan view of a typical plan path of the instant invention and associated measurements.

Referring now to FIG. 9, typical turns (γ) in the mine are 90, 120, and 135 degrees, respectively. The small variations of these angles, normally happen due to errors in guidance system for a continuous miner 40. The average width, U, of a mine passage is usually 20 ft. Based on values of γ and U, a particular type of turn can be specified. One function of the path planning strategy is that for any given dimension of the CHS, the path planning strategy can generate the safest path that each MBC in the CHS must follow, as shown as dashed line 300. A path planning algorithm has been developed for this task. The inputs to this algorithm are the dimensions of the mine passage ($\gamma$ and U) and the CHS, both end points of the path, and slopes at both end points. Based on these inputs, the search algorithm generates series of fourth degree polynomial curves, the MBC path, satisfying the end point conditions, and evaluates the value of the cost function for each of the generated polynomial curve. The cost function, J, is defined as follows:

$$J = \int_0^L (w_1 a^2(s) + w_2 \beta^2(s) - w_3 d^2(s) - w_4 v_{err}(s)) ds$$

where $w_1$, $w_2$, $w_3$, and, $w_4$=weighting factor.

$\alpha$=angle between the front MBC and the piggyback conveyor $\beta$=angle between the rear MBC and the piggyback conveyor d=minimum clearance between the piggyback conveyor and the walls.

$v_{err}$=maximum allowable error of the track velocities.

s=path arc length.

L=total path length.

Figure 10:
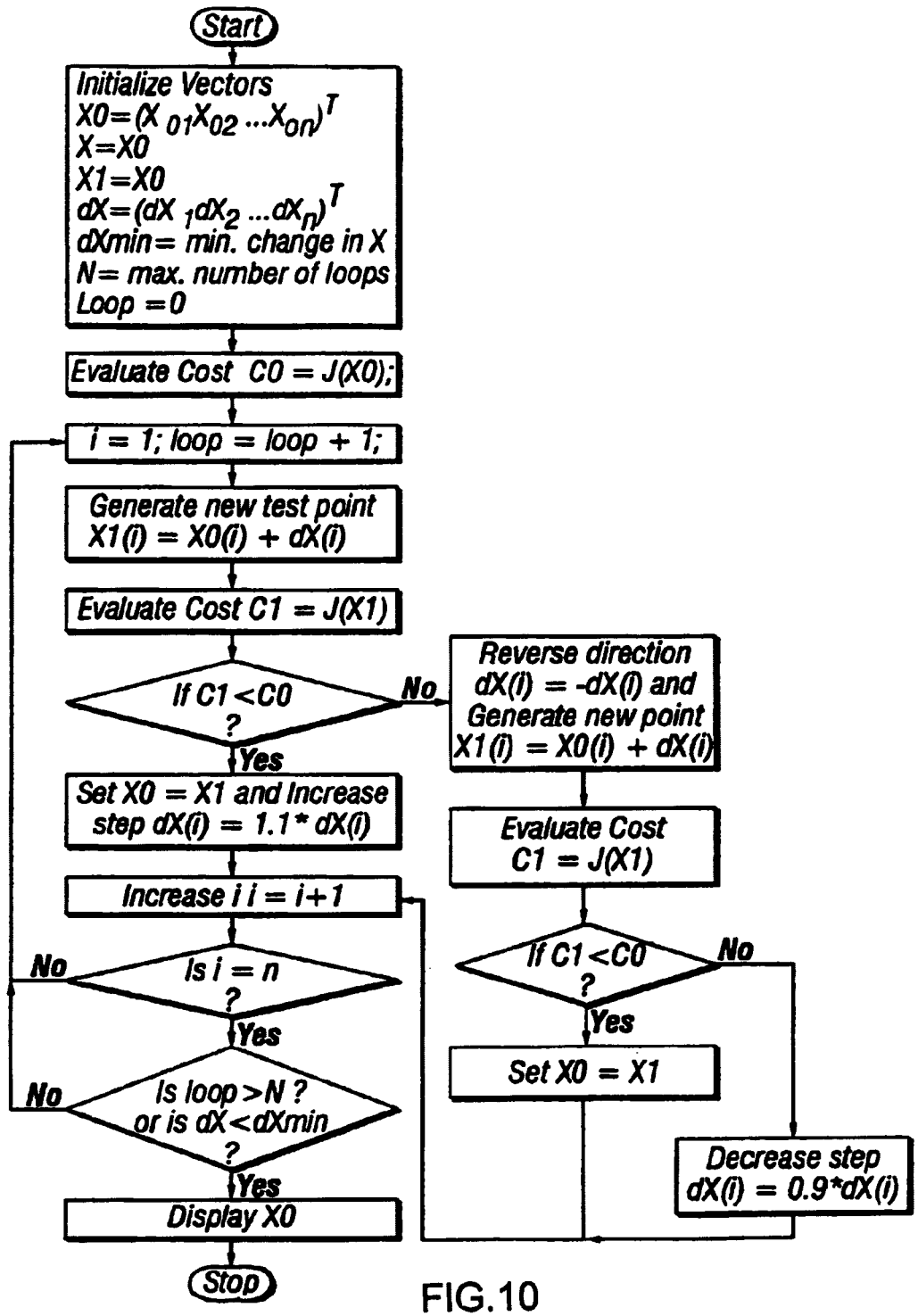
FIG. 10 is a flow chart setting forth the Hooke & Jeeves' algorithm.

The objective of searching is to find the path that minimizes the cost function. The search algorithm utilizes the optimization method called "Hooke & Jeeves' method". It explores the search domain, and saves the search direction that yields the minimum value of the cost function in every iteration. The search is terminated when the difference between the value of the cost function at the current iteration and that of the previous iteration is less than a specified number, or when the number of iteration exceeds a limit. A flow diagram of the Hooke & Jeeves' method is presented in FIG. 10, wherein $x_0$, $x_1$, ... $x_n$ represent the path coefficients, further described below. The interpretation of the cost function is that the angles between each segment of the CHS must be minimized; in other words, the arrangement of the CHS should be as straight as possible to prevent the CHS from jackknife. Inversely, the piggyback conveyor clearance must be maximized throughout the turn to avoid possible collision. At the same time, the planned path must have high error tolerance for each MBC to track, or we can say that the path allows the MBCs to have large error in the track velocity control in order to complete the turn. In this context, the word "complete" means that the system makes turns without colliding with the walls.

In evaluating the cost for each candidate of polynomial curves, a pair of MBCs move along the generated path exactly while the piggyback conveyor length keeps them apart. The whole path length is divided into small steps. Every step that the MBCs move, the values of $\alpha$, $\beta$, and d are simply determined by geometrical means, but $v_{err}$ for each MBC can be obtained by computer simulations only. This simulation occurs within the main routine of the search algorithm. It first calculates track speeds of the MBC for the next control cycle at the current configuration of the MBC. These speeds are called nominal speeds, which is the speeds that the MBC must maintain exactly to ensure that the MBC reaches the next configuration located on the path after one control cycle has passed. However, it is impossible for the MBC to execute the nominal speeds exactly as it is commanded. There are several factors such as slippage and control error that contribute error to the nominal speeds this speed error is modeled as a percentage of the nominal speeds. The following equations are used to compute the actual speeds that the MBC executes over one control cycle:

$$v_{r,actual} = (1 \pm v_{err}) \Leftrightarrow v_{r,nom}$$

$$v_{l,actual} = (1 \pm v_{err}) \Leftrightarrow v_{l,nom}$$

Two assumptions are that $v_{err}$ is the same for both tracks and that $v_{r,actual}$ and $v_{l,actual}$ are constant over one control cycle. The value of $v_{err}$ is always positive without upper limit. The simulation starts the value of $v_{err}$ from zero, and calculates the net motion of the MBC within one control cycle. Then, the simulation checks whether there is any collision between the MBC and mine walls. If there is no collision, the simulation keeps increasing the value of $v_{err}$, and terminates when the collision is occurred. The value of $v_{err}$ that causes the collision is the maximum allowable error in speed control at that MBC's configuration. Summing up all the weight-squared $\alpha$s, $\beta$s, ds, and $v_{err}$s along the entire candidate path, the cost of each can be obtained.

With a 90-degree turn, the path starts from the middle of one passage to another. This allows the path to connect to straight paths on both sides. The coefficients of the equation of this path with 20 ft. and 22 ft. mine widths are listed in Table 1, below, along with the coefficients of the path for a 120 and 135-degree turns.

TABLE 1

| U(ft.) | $\gamma$(Deg.) | a | b | c |
| --- | --- | --- | --- | --- |
| 20 | 90 | 0.0308 | 0 | −13.447 |
| 20 | 120 | 0.0165 | 0 | −10.711 |
| 20 | 135 | 0.0111 | 0 | −10.064 |
| 22 | 90 | . | . | . |
| . | . | . | . | . |
| . | . | . | . | . |
| 22 | 120 | . | . | . |
| . | . | . | . | . |
| . | . | . | . | . |
| . | . | . | . | . |
| . | . | . | . | . |
| . | . | . | . | . |

Where: $y = ax^2 + bx + c$

One skilled in the art will note that a quadratic equation is presented above to solve for the path coefficients. While this equation is certainly sufficient to obtain proper path planning, the more coefficients introduced, the more accurate the path plan. However, as can be appreciated, the larger the number the coefficients utilized, the greater amount of computing time required. It therefore most preferred to use a fourth-ordered polynomial equation, such as in the following form:

$$y = c0x^4 + c1x^3 + c2x^2 + c3x + c4$$

The whole path for each MBC will consist of an alternating series of turns and straight paths depending on the location of the MBC in the mine; however, there is an exception for a special type of turn called "S-turn", which is considered as the hardest one. The path for an S-turn is made up of two turns concatenated to each other. Because both ends of the S-turn are not located in the middle of the passages, both ends of the S-turn must connect to straight paths. Hence, it is impossible to have one S-turn immediately after another S-turn. Nevertheless, this occurs within 90-degree mine only as 120 and 135-degree mines do not have enough space to allow the S-turn to begin and end at the middle of the mine passage.

Because it takes many hours for the search algorithm to arrive at the optimal path, it is impossible to perform an online-path planning. This problem is solved by conducting offline-path planning for possible types of turns, and establish a lookup-table containing path coefficients corresponding to each particular turn (such as Table 1). Once an MBC controller determines what type of turn it is, the controller can instantly calculate suitable path coefficients from the lookup-table by interpolation. Although a path generated by this approach is somewhat sub-optimal, as compared to live computations, a test run results show minimized degradation of system performance in navigating itself through the simulated mine.

Up to this point, the MBC knows its current POSE and the path that it must follow the MBC must next determine how it gets to the desired destination. A path tracking algorithm computes both track assembly speeds for the MBC such that the MBC can track the path accurately. While there is a lot of literature in path tracking control for two-wheeled robots, which are kinematically identical to tracked vehicle, the instant invention implements the path tracking algorithm proposed by Aguilar et al. ("Robust Path-Following Control with Exponential Stability for Mobile Robots", Proc. of the 1998 IEEE Int. Conf. on Robotics and Automation, Leuven, Belgium, May 1998).

There are two parameters, $y_e$ and $\theta_e$, needed as inputs to the MBC controller at any instant for path tracking. The $y_e$ is a shortest distance from the center of the MBC to the path, and the $\theta_e$ is an orientation error measured from a line tangent to the path. Given a forward or backward velocity, v, an angular velocity of the MBC can be calculated from the following expression:

$$\omega = -4v\left[(\alpha_1\alpha_2)y_e + (\alpha_1 + \alpha_2)\sin\left(\frac{\theta_e}{2}\right)\text{sign}(v)\right]$$

where
$\alpha_1$ and $\alpha_2$ are constant controller gains, which must be tuned to receive the desired tracking response of the MBC.

The velocity v is directly related to allowable traverse distances on the MBC's dolly and right behind MBC's dolly in the direction of motion. Both dolly traverse distances are compared, and the one that has less value will be chosen this distance can be denoted as "slider".

The forward or backward velocity thus can be computed from:

$$v = \frac{\pm dolly}{T}$$

where
v is positive/negative when moving forward/backward, respectively.
T=control cycle period, seconds.
±dolly=speed of dolly from linear potentiometer.

Then, right and left track velocities can be determined from:

$$V_r = v + \frac{\omega B}{2}$$

-continued $$V_l = v - \frac{\omega B}{2}$$

where
B=the distance between the tracks.

The path tracking algorithm, including the path-planning algorithm, is preferably implemented in common computer language, such as C. It is also preferable to combine both algorithms in one program because both of them use a great deal of common information.

B) Piggyback Conveyor Height

In the instant invention, the elevation of a leading or a trailing conveyor extension is controlled by continuously processing the distance measurement from the height determination sensor, computing the difference from a given set point, and applying a proportion of that difference to control the opening of a hydraulic control valve 24 (see FIG. 1). The processing step consists of comparing distance measurements with a number of previous measurements, computing a moving average over many cycles, ignoring outlying data points, and computing an average over fewer cycles. This result obtains a reliable measurement of clearance under potentially noisy data collection conditions, while minimizing the delay encountered with a conventional low-pass filter. One of skill in the art will understand that a large number of analog or digital filtering techniques may be substituted for the preferred embodiment just described.

The set point(s) for elevation control is determined preferably by the mine operator and used by the measurement processor as an input. In the case of a single distance measurement, for example, floor distance only, this set point determines the target distance value below, which the elevation is asserted to rise, and below which the elevation is asserted to drop. In the case of dual distance measurements, for example, floor and roof distances, these set points determine a band of "no action" for the elevation control, as well as the target distance value below which the elevation is asserted to rise, and below which the elevation is asserted to drop. It is further advantageous to employ dual measurements for redundancy by implementing a switch in the measurement processor to determine which or both of the measurement signals is valid. One skilled in the art will recognize that the proportion of the measured distance from the setpoint should be selected to obtain near critically damped response. Such techniques as PID-control are well-known in the art.

In addition to the uses immediately described above, it will be apparent to those skilled in the art that other modifications and variations can be made the method of the instant invention without diverging from the scope, spirit, or teaching of the invention. Therefore, it is the intention of the inventors that the description of instant invention should be considered illustrative and the invention is to be limited only as specified in the claims and equivalents thereto.

We claim:

1. A method of controlling an automated two track or wheel vehicle through a maze, wherein the vehicle includes a track controller having a control cycle period, the vehicle having a front portion pivotally coupled to an elongated adjacent front structure via a first trolley, and a rear portion pivotally coupled to an elongated adjacent rear structure, the elongated rear structure coupled to a second trolley, each trolley providing at any given point in time a minimum available travel distance between the vehicle and the corresponding structure, the maze defined by walls which open to intersections, the intersections each having an angle wherein each angle is formed by a number of degrees substantially equal to the other angles, wherein the number of the degrees is known, the method comprising:
- obtaining a first set of range data from a sensor located on the left side of the vehicle;
- obtaining a second set of range data from a sensor located on the right side of the vehicle;
- determining, for each set of range data, the biggest group defined by consecutive distances having a difference less than a setting threshold;
- dividing, for each set of range data, the biggest group into subgroups using recursive line-splitting technique, each subgroup defining a line;
- selecting, for each set of range data, the two subgroups which define the two longest lines, whereby a wall on each side of the vehicle is represented by the respective selected subgroups;
- defining a global coordinate frame based on the two longest lines;
- determining the width of the maze between the walls adjacent the vehicle;
- selecting from a table, based on the width and the number of degrees, a polynomial curve which minimizes a cost function, whereby the selected polynomial curve represents the path which provides the greatest assurance that the vehicle and the front and rear structures will not collide with the walls of the maze;
- determining the point along the polynomial curve path having the shortest distance to a center of the vehicle, thus determining a closest point;
- determining the angle between the longitudinal axis of the vehicle as measured from a line tangent to the closest point;
- determining the shortest of the travel distances of the first trolley and the second trolley;
- determining the travel velocity required for the vehicle to move the shortest travel distance during the control cycle period;
- determining, based on the travel velocity, the angular velocity of the vehicle towards the closest point;
- determining the left and right track or wheel velocities based on the travel velocity and angular velocity; and
- accelerating the vehicle, via the controller, in accordance with the left and right velocities, whereby the vehicle is directed towards the closest point along the polynomial curve path.

2. A control system for controlling an automated two track or wheel vehicle through a maze, the vehicle having a front portion pivotally coupled to an elongated adjacent front structure via a first trolley, and a rear portion pivotally coupled to an elongated adjacent rear structure, the elongated rear structure coupled to a second trolley, each trolley providing at any given point in time a minimum available travel distance between the vehicle and the corresponding structure, the maze defined by walls which open to intersections, the intersections each having an angle of substantially the same number of degrees, wherein the number of the degrees is known, the system comprising:
- a track or wheel controller having a control cycle period;
- a first sensor located on the left side of the vehicle for obtaining a first set of range data;
- a second sensor located on the right side of the vehicle for obtaining a second set of range data, the first and second sensor for determining the width of the maze between the walls adjacent the vehicle;
- means for determining, for each set of range data, the biggest group defined by consecutive distances having a difference less than a setting threshold;
- means for dividing, for each set of range data, the biggest group into subgroups using recursive line-splitting technique, each subgroup defining a line;
- means for selecting, for each set of range data, the subgroup which defines the longest line, whereby a wall on each side of the vehicle is represented by the respective selected subgroup;
- means for selecting from a table, based on the width and the number of degrees, a polynomial curve which minimizes a cost function, whereby the selected polynomial curve represents the path which provides the greatest assurance that the vehicle and the front and rear structures will not collide with the walls of the maze;
- means for determining the point along the polynomial path having the shortest distance to a center of the vehicle thus determining a closest point;
- means for determining the angle between the longitudinal axis of the vehicle as measured from a line tangent to the closest point;
- means for determining the shortest of the travel distances of the first trolley and the second trolley;
- means for determining the travel velocity required for the vehicle to move the shortest travel distance during the control cycle period;
- means for determining, based on the travel velocity, the angular velocity of the vehicle towards the closest point;
- means for determining the left and right track or wheel velocities based on the travel velocity and angular velocity; and
- means for activating the controller for accelerating the vehicle, in accordance with the left and right velocities, whereby the vehicle is directed towards the closest point along the polynomial path.

3. The control system of claim 2, wherein the vehicle is a mobile bridge carrier having a left track and a right track, the front portion having a slidable first trolley which is pivotally coupled to the front structure which is a first bridge conveyor, and the rear structure is a second bridge conveyor coupled to another mobile bridge carrier having a second trolley, the system further comprising:
- two PIC servo controller boards coupled to the left and right tracks;
- the first and second sensors are each an infrared laser scanner;
- a means for filtering range data which represents an adjacent bridge conveyor in view of the first or second sensor, wherein the adjacent bridge conveyor is not interpreted as part of the walls of the maze, the filtering means includes an angular potentiometer coupled between the mobile bridge carrier and an adjacent bridge conveyor; and
- the means for determining the shortest of the two travel distances includes a first linear potentiometer coupled between the first trolley and the mobile bridge carrier, and a second linear potentiometer coupled between the rear structure and the second trolley.

4. A method of determining the position and orientation of an automated vehicle with respect to a wall adjacent the vehicle wherein the vehicle is pivotally coupled to an adjacent structure located in an area, the method comprising the steps of:

obtaining range data from a sensor on the vehicle;

filtering out potentially erroneous data, said filtering step including determining the position of the adjacent structure, and discarding data which corresponds to the area the adjacent structure is located;

determining a biggest group of range data defined by consecutive distances having a difference less than a setting threshold;

dividing the biggest group of range data into subgroups using recursive line-splitting technique, each subgroup defining a line; and selecting the subgroup which defines the longest line, whereby the wall is represented by the selected subgroup.

5. The method of claim 4, wherein the position of the adjacent structure is obtained by determining the angle of the adjacent structure with respect to the vehicle.

6. The method of claim 4, further comprising, prior to the step of dividing, the step of filtering out potentially erroneous data includes ignoring data having a measured distance greater than a specified limit.

7. The method of claim 4, wherein the step of obtaining range data includes measuring the distance from a point at the vehicle to any object located adjacent the vehicle within a substantially horizontal plane, the step of measuring including measuring a plurality of distances within an arc extending from the point and within the substantially horizontal plane, whereby the range data consists of a plurality of consecutive measured distances between the point at the vehicle and any object located within the substantially horizontal plane.

8. The method of claim 7, wherein the step of determining includes determining a difference of measured distance between adjacent measurements, determining if the difference is greater than a setting threshold, and dividing the range data between two adjacent measurements if the difference between the two adjacent measurements is greater than the setting threshold.

9. The method of claim 4, wherein the selecting step includes selecting the two subgroups which define the longest line and a second, next longest line, together comprising the two longest lines, whereby the wall is represented by the selected two subgroups.

10. The method of claim 9, further comprising, after the selecting step, the step of defining a global coordinate frame based on the two longest lines.

11. The method of claim 4, wherein the automated vehicle is a mining vehicle located in a mine environment, and the method determines the position and orientation of the mining automated vehicle with respect to a wall adjacent both sides of the vehicle, the method comprising the steps of:

obtaining a first set of range data from a sensor located on a first side of the vehicle;

obtaining a second set of range data from a sensor located on a second side of the vehicle;

determining, for each set of range data, the biggest group defined by consecutive distances having a difference less than a setting threshold;

dividing the biggest group, for each set of range data, into subgroups using recursive line-splitting technique, each subgroup defining a line; and selecting the subgroup, for each set of range data, which defines a longest line, whereby the mine environment is represented by the selected subgroup from the first and second range data.

12. A method of path planning for an automated vehicle through a maze, the vehicle having a front portion pivotally coupled to an elongated adjacent front structure, and a rear portion pivotally coupled to an elongated adjacent rear structure, the maze defined by walls which open to intersections, the intersections each having an angle of substantially a same number of degrees, wherein the number of the degrees is known and the position and orientation of the vehicle is known with respect to the maze, the method comprising:

determining a width of the maze between the walls adjacent the vehicle; and selecting from a table, based on the width and the number of degrees, a polynomial curve which minimizes a cost function, whereby the selected polynomial curve represents a path which provides an assurance having a greatest confidence that the vehicle and the front and rear structures will not collide with the walls of the maze.

13. The method of claim 12, wherein the table is generated offline, the method further comprising the steps of:

a) generating a polynomial curve, for a maze with a first width and a first angle, based on parameters representing an allowable position and orientation of the vehicle and rear and front structures, and on a set of random coefficients;

b) repeat step a) a plurality of times, each time with a different set of random coefficients;

c) determine the coefficients of a polynomial curve having the minimum cost function;

d) storing the coefficients of the curve, representing the minimized cost function, and the corresponding first width and angle in the table; and e) repeat steps a) through d) for a further width and angle, whereby a table is created having coefficients representing the minimized cost function for a given width and angle.

14. The method of claim 12 wherein one or more angles are formed between the vehicle and the adjacent structures and there is an error tolerance for the vehicle to track the curve, further comprising the steps of:

weighting a cost function as minimized if the angles between the vehicle and the adjacent structures are minimized;

weighting a cost function as minimized if the clearance between the structures and the maze, through the turn, are maximized; and weighting a cost function as minimized if the error tolerances for the vehicle to track the curve is maximized.

15. A method of path tracking for a two-track or two wheel vehicle, wherein the vehicle includes a track or wheel controller having a control cycle period, the vehicle coupled to at least one structure via a trolley, the trolley providing at any given point in time a minimum available travel distance between the vehicle and the structure, wherein the vehicle position and orientation within a global coordinate frame is known, and the coefficients of a polynomial path plotted within the global coordinate frame is known, the method comprising:

determining the point along the polynomial path having the shortest distance to a center of the vehicle thus determining a closest point;

determining an angle between the longitudinal axis of the vehicle as measured from a line tangent to the closest point;

determining the travel distance between the vehicle and the structure;

determining a travel velocity required for the vehicle to move the travel distance during the control cycle period;

determining, based on the travel velocity, an angular velocity of the vehicle towards the closest point;

determining the left and right track or wheel velocities based on the travel velocity and angular velocity; and accelerating the vehicle, via the controller, in accordance with the left and right velocities, whereby the vehicle is directed towards the closest point along the polynomial path.

* * * * *